(12) United States Patent
Hu et al.

(10) Patent No.: US 7,866,897 B2
(45) Date of Patent: Jan. 11, 2011

(54) APPARATUS AND METHOD OF COUPLING A FIBER OPTIC DEVICE TO A LASER

(75) Inventors: Yongdan Hu, Bothell, WA (US); Oscar Romero, Tucson, AZ (US); James Harrison, Oro Valley, AZ (US)

(73) Assignee: Oclaro Photonics, Inc., San Jose, CA (US)

( * ) Notice: Subject to any disclaimer, the term of this patent is extended or adjusted under 35 U.S.C. 154(b) by 0 days.

(21) Appl. No.: 11/973,207

(22) Filed: Oct. 6, 2007

(65) Prior Publication Data

US 2008/0131060 A1 Jun. 5, 2008

Related U.S. Application Data

(60) Provisional application No. 60/850,092, filed on Oct. 6, 2006.

(51) Int. Cl.
*G02B 6/38* (2006.01)
*G02B 6/36* (2006.01)

(52) U.S. Cl. .............. 385/92; 385/66; 385/14

(58) Field of Classification Search .......... 385/14, 385/88
See application file for complete search history.

(56) References Cited

U.S. PATENT DOCUMENTS

| | | | |
|---|---|---|---|
| 4,428,647 A | 1/1984 | Sprague | |
| 4,763,975 A | 8/1988 | Seifres | |
| 4,910,539 A * | 3/1990 | Mathis et al. | 385/1 |
| 5,127,068 A | 6/1992 | Baer | |
| 5,144,486 A | 9/1992 | Hart | |
| 5,168,401 A | 12/1992 | Endriz | |
| 5,230,969 A | 7/1993 | Savant et al. | |
| 5,243,619 A | 9/1993 | Albers et al. | |
| 5,365,366 A | 11/1994 | Kafka et al. | |
| 5,367,529 A | 11/1994 | Holsinger et al. | |
| 5,446,749 A | 8/1995 | Nighan et al. | |
| 5,513,201 A | 4/1996 | Yamaguchi | |

(Continued)

FOREIGN PATENT DOCUMENTS

JP 0411233857 A 8/1999

(Continued)

OTHER PUBLICATIONS

Andersen et al., "High Repetition Rate Tunable Femtosecond Pulses from Fiber Laser Pumped Parametric Amplifier," Advanced Solid-State Photonics, ME2, Abstract of Talk 4:30pm Jan. 30, 2006.

(Continued)

*Primary Examiner*—Ryan Lepisto
*Assistant Examiner*—Eric Wong
(74) *Attorney, Agent, or Firm*—Grant Anderson LLP (57) ABSTRACT

The present application is directed to a various embodiments of a system for coupling at least one fiber optic device to a laser and include at least one fiber coupler device having a body defining at least one coupling chamber in communication an inlet and an outlet, the coupling chamber sized to receive at least one fiber optic device therein, at least one light stripping element positioned within the coupling chamber, and a housing assembly configured to couple the laser to the fiber coupler device.

22 Claims, 10 Drawing Sheets

U.S. PATENT DOCUMENTS

| | | | |
|---|---|---|---|
| 5,579,422 | A | 11/1996 | Head et al. |
| 5,691,989 | A | 11/1997 | Rakuljic et al. |
| 5,740,288 | A | 4/1998 | Pan |
| 5,740,292 | A | 4/1998 | Strasser |
| 5,787,107 | A | 7/1998 | Leger |
| 5,808,323 | A | 9/1998 | Spaeth |
| 5,825,551 | A | 10/1998 | Clarkson |
| 5,832,150 | A | 11/1998 | Flint |
| 5,986,794 | A | 11/1999 | Krause |
| 5,999,544 | A | 12/1999 | Petersen |
| 6,044,096 | A | 3/2000 | Wolak et al. |
| 6,064,515 | A | 5/2000 | Yang |
| 6,160,664 | A | 12/2000 | Du et al. |
| 6,175,452 | B1 | 1/2001 | Ullmann et al. |
| 6,185,235 | B1 | 2/2001 | Cheng et al. |
| 6,215,598 | B1 | 4/2001 | Hwu |
| 6,314,116 | B1 | 11/2001 | Wright et al. |
| 6,331,692 | B1 | 12/2001 | Krause et al. |
| 6,335,822 | B1 | 1/2002 | Toyohara |
| 6,337,873 | B1 | 1/2002 | Goering et al. |
| 6,356,380 | B1 | 3/2002 | Whitney |
| 6,356,577 | B1 | 3/2002 | Miller |
| 6,389,198 | B2 | 5/2002 | Kafka et al. |
| 6,428,217 | B1 * | 8/2002 | Giltner ................. 385/95 |
| 6,493,148 | B1 | 12/2002 | Anikitchev |
| 6,504,858 | B2 | 1/2003 | Cheng et al. |
| 6,516,011 | B1 | 2/2003 | Treusch |
| 6,594,092 | B2 | 7/2003 | von Freyhold et al. |
| 6,600,605 | B1 | 7/2003 | Anikitchev |
| 6,768,593 | B1 | 7/2004 | Jutamulia |
| 6,771,686 | B1 | 8/2004 | Ullman et al. |
| 6,822,978 | B2 | 11/2004 | Kafka et al. |
| 6,831,778 | B2 | 12/2004 | Yang et al. |
| 6,876,784 | B2 | 4/2005 | Nikolov et al. |
| 6,882,664 | B2 | 4/2005 | Bolshtyansky et al. |
| 6,888,679 | B2 | 5/2005 | Brown |
| 6,891,876 | B2 | 5/2005 | Sutter et al. |
| 6,897,486 | B2 | 5/2005 | Loh |
| 6,898,231 | B2 | 5/2005 | Butterworth |
| 6,919,990 | B2 | 7/2005 | Anikitchev et al. |
| 6,922,288 | B2 | 7/2005 | Yamanka et al. |
| 6,922,419 | B1 | 7/2005 | Nighan et al. |
| 6,931,037 | B2 | 8/2005 | Nighan et al. |
| 6,969,206 | B2 | 11/2005 | Iwanaga et al. |
| 6,977,769 | B2 | 12/2005 | Matsushita et al. |
| 6,985,648 | B2 | 1/2006 | Kish et al. |
| 6,993,059 | B2 | 1/2006 | Anikitchev et al. |
| 7,006,194 | B2 | 2/2006 | Sumiyoshi et al. |
| 7,006,549 | B2 | 2/2006 | Anikitchev et al. |
| 7,010,194 | B2 | 3/2006 | Anikitchev et al. |
| 7,065,105 | B2 | 6/2006 | Ehlers et al. |
| 7,244,965 | B2 | 7/2007 | Andrews et al. |
| 7,259,907 | B2 | 8/2007 | Langhans |
| 7,322,754 | B2 * | 1/2008 | Wolf et al. .................... 385/93 |
| 7,379,237 | B1 * | 5/2008 | Di Teodoro et al. ..... 359/341.41 |
| 2003/0161357 | A1 | 8/2003 | Bolshtyansky et al. |
| 2004/0252744 | A1 | 12/2004 | Anikitchev et al. |
| 2004/0258117 | A1 | 12/2004 | Nebel et al. |
| 2005/0018743 | A1 | 1/2005 | Volodin et al. |
| 2005/0069255 | A1 | 3/2005 | Nishimura et al. |
| 2005/0207454 | A1 | 9/2005 | Starodoumov et al. |
| 2005/0248819 | A1 | 11/2005 | Hymel et al. |
| 2005/0248820 | A1 | 11/2005 | Moser et al. |
| 2006/0039418 | A1 | 2/2006 | Anikitchev et al. |
| 2006/0045143 | A1 | 3/2006 | Anikitchev et al. |
| 2006/0114955 | A1 | 6/2006 | Steckman |
| 2006/0126690 | A1 | 6/2006 | Kido et al. |
| 2006/0263004 | A1 | 11/2006 | Klimek et al. |
| 2006/0280209 | A1 | 12/2006 | Treusch et al. |
| 2007/0268571 | A1 | 11/2007 | Hu et al. |
| 2007/0268572 | A1 | 11/2007 | Hu et al. |
| 2007/0291373 | A1 | 12/2007 | Hu et al. |
| 2007/0291813 | A1 | 12/2007 | Hu et al. |
| 2008/0101429 | A1 | 5/2008 | Sipes et al. |
| 2009/0251697 | A1 | 10/2009 | Cutillas |

FOREIGN PATENT DOCUMENTS

| | | |
|---|---|---|
| JP | 2002148491 A | 5/2002 |
| WO | WO 99/49343 | 3/1999 |
| WO | WO 2009/137703 | 11/2009 |

OTHER PUBLICATIONS

Becht, Vector phase conjuguation for beam combining in a pulsed Nd:YAG laser system, Proceedings of the SPIE—The International Society for Optical Engineering, 3263:11-19 (1998).

Brunner et al., "Powerful red-green-blue laser source pumped with a mode-locked thin disk laser," Optics Letters 29(16):1921-1923, Aug. 15, 2004.

Fuhr, Polarization power summing in laser diode communication systems, SPIE 740:70-76 (1987).

Ghislotti et al., Bidirectional Pumping of Er-Doped Fibers Using Detuned 980-nm Lasers, IEEE Photonics Technology Letters 14(5):780-782 2002.

Headley et al., Tapered Fiber bundles for combining laser pumps., Proceedings of the SPIE—The International Society for Optical Engineering, 5709(1):263-272 (200).

Knitsch et al., Diode Laser Modules of Highest Brilliance for Materials Processing, Proceedings of the SPIE, vol. 4651:256-263 (2002).

Kruglov et al., "Self-similar propagation of parabolic pulses in normal-dispersion fiber amplifiers," JOSA B, 19(3):461-469 2002.

Mecherle, Laser diode combining for free space optical communication, Proceedings of the SPIE—The International Society for Optical Engineering, 616:281-291 (1986).

Miyajima et al., Single Wavelength 5.6 Direct Diode Laser with a High-Efficiency Beam Combination, Jpn. J. Appl. Phys., 43(8):5269-5272 (2004).

Moser et al., "Volume Bragg Grating Devices," Friday Morning Optical Fiber Communications Conference, 2003, OFC 2003 pp. 644-645, vol. 2, Mar. 28, 2003.

Ondax, Inc., "Volume Holographic Gratings (VHG)," 2005 pp. 1-7.

PCT International Search Report and Written Opinion for PCT/US2007/068717 Completed: Nov. 26, 2007.

Piper et al., 1.2 mJ, 37 ns single-moded pulses at 10kHz repetition rate from a Q-switched ytterbium fiber Laser, Abstract, In, Proceedings of CLEO/IQEC May 16-21, 2004: Conference on Lasers and Electro-Optics, Quantum Electronics and Laser Science. USA, Institute of Electrical and Electronics Engineers.

Rothenberg, Polarization beam smoothing for ineertial confinement fusion, J. Applied Physics, 87(8):3654-3662 (2000).

Sincerbox, Laser Beam Combining, IBM Technical Disclosure Bulletin, 12(10):1663-1664 (1970).

Steinmann et al., "Tunable fs Laser Pulses from OPA with MHz Repetition Rate," Advanced Solid-State Photonics, TuC6, Abstract of Talk, 12:30pm Jan. 31, 2006.

Thestrup et al, High brightness laser source based on polarization coupling of two diode lasers with asymmetric feedback, Applied Physics Letters, 82(5):680-682 (2003).

Tra Fiberoptics, Inc. High-Powered SMA Connectors for Photonic Crystal Fiber. TraTech Fiberoptic, Inc. Brochure; 2004.

Treusch et al., High-Brightness Semiconductor Laser Sources for Materials Processing: Stacking, Beam Shaping, and Bars, IEEE Journal of Selected Topics in Quantum Electronics, 6(4):601-614 (2000).

Valdor Fiber Optics Catalog #910-00001, pp. 1-2 Impact Mount Singlemode Laser Pigtails, Printed from the internet: Dec. 22, 2006.

Volodin et al., Wavelength Stabilization and spectrum narrowing of high-power multimode laser diodes and arrays by use of volume Bragg gratings. Optics Letters 29(16): Aug. 15, 2004.

* cited by examiner

APPARATUS AND METHOD OF COUPLING A FIBER OPTIC DEVICE TO A LASER

CROSS REFERENCE TO RELATED APPLICATIONS

The present application claims priority to U.S. Provisional Patent Application Ser. No. 60/850,092, filed Oct. 6, 2006, the entire contents of which are hereby incorporated by reference in its entirety herein

STATEMENT REGARDING FEDERALLY SPONSORED RESEARCH OR DEVELOPMENT

This invention was made with U.S. Government support under Contract No. FA9451-06-D-0011/DO 0001 awarded by the U.S. Air Force. The U.S. Government has certain rights in the invention

BACKGROUND

Fiber optic devices are used in a variety of applications. For example, these devices are often coupled to laser systems or devices and configured to deliver laser radiation to a desired location. Generally, these fiber optic devices comprise at least one fiber core positioned within or surrounded by one or more cladding layers or materials. The core may be configured to transmit at least one optical signal there through. The cladding positioned about the core has a lower index of refraction than the core, thereby advancing the signal through the core via total internal reflection.

In some applications, the optical signal will be coupled only into the core of the optical fiber. However, often the spot size of the optical signal coupled into the core is larger than the numerical aperture of the fiber optic. As such, some light may be undesirably coupled into the cladding of the fiber optic. At sufficient powers, optical radiation coupled into the cladding has been shown to contribute to a degradation of performance of the optical system incorporating the fiber optic device. For example, the light coupled into the cladding of the fiber optic may increase the possibility of failure at fiber splice locations. Further, localized heating may occur due the light coupled into the cladding.

Thus, in light of the foregoing, there is an ongoing need for methods and devices of coupling a fiber optic device to a laser system.

SUMMARY

The present application is directed to a various embodiments of a system for coupling at least one fiber optic device to a laser. For example, the coupling device may be configured to couple one or more fiber optic devices to at least one laser, emitter, or other source of optical radiation. In one embodiment, the present application discloses a system for coupling at least one fiber optic device to a laser and includes at least one fiber coupler device having a body defining at least one coupling chamber in communication an inlet and an outlet, the coupling chamber sized to receive at least one fiber optic device therein, at least one light stripping element positioned within the coupling chamber, and a housing assembly configured to couple the laser to the fiber coupler device.

In another embodiment, the present application is directed to a system for coupling at least one fiber optic device to a laser and includes a fiber coupler device having a body defining at least one coupling chamber in communication an inlet and an outlet, the coupling chamber sized to receive at least one fiber optic device therein, a light stripping element positioned within the coupling chamber and configured to strip light from a cladding of the fiber optic device, and a housing assembly configured to secure the fiber coupler device to the laser and having a fiber coupler receiver formed therein, the fiber coupler receiver configured to receive the fiber coupler therein.

In still another embodiment, the present application is directed to a system for coupling at least one fiber optic device to a laser and includes a fiber coupler device having a body defining at least one coupling chamber in communication an inlet and an outlet, the coupling chamber sized to receive at least one fiber optic device therein, a light stripping element positioned within the coupling chamber and configured to strip light from a cladding of the fiber optic device, and a housing assembly configured to secure the fiber coupler device to the laser, the housing assembly having a first housing body and a second housing body configured to form a fiber coupler receiver formed therein, the fiber coupler receiver configured to receive the fiber coupler therein.

In another embodiment, the present application is directed to a light stripping element for outcoupling light from the cladding of a fiber optic device and includes a material body having an index of refraction greater than the index of refraction of a cladding of the fiber optic device, and at least one stripping passage formed within the material body and sized to received the fiber optic device therein.

Other features and advantages of the embodiments of systems for coupling at least one fiber optic device to a laser as disclosed herein will become apparent from a consideration of the following detailed description.

BRIEF DESCRIPTION OF THE DRAWINGS

Various embodiments of systems for coupling at least one fiber optic device to a laser will be explained in more detail by way of the accompanying drawings, wherein.

DETAILED DESCRIPTION

Figure 1:
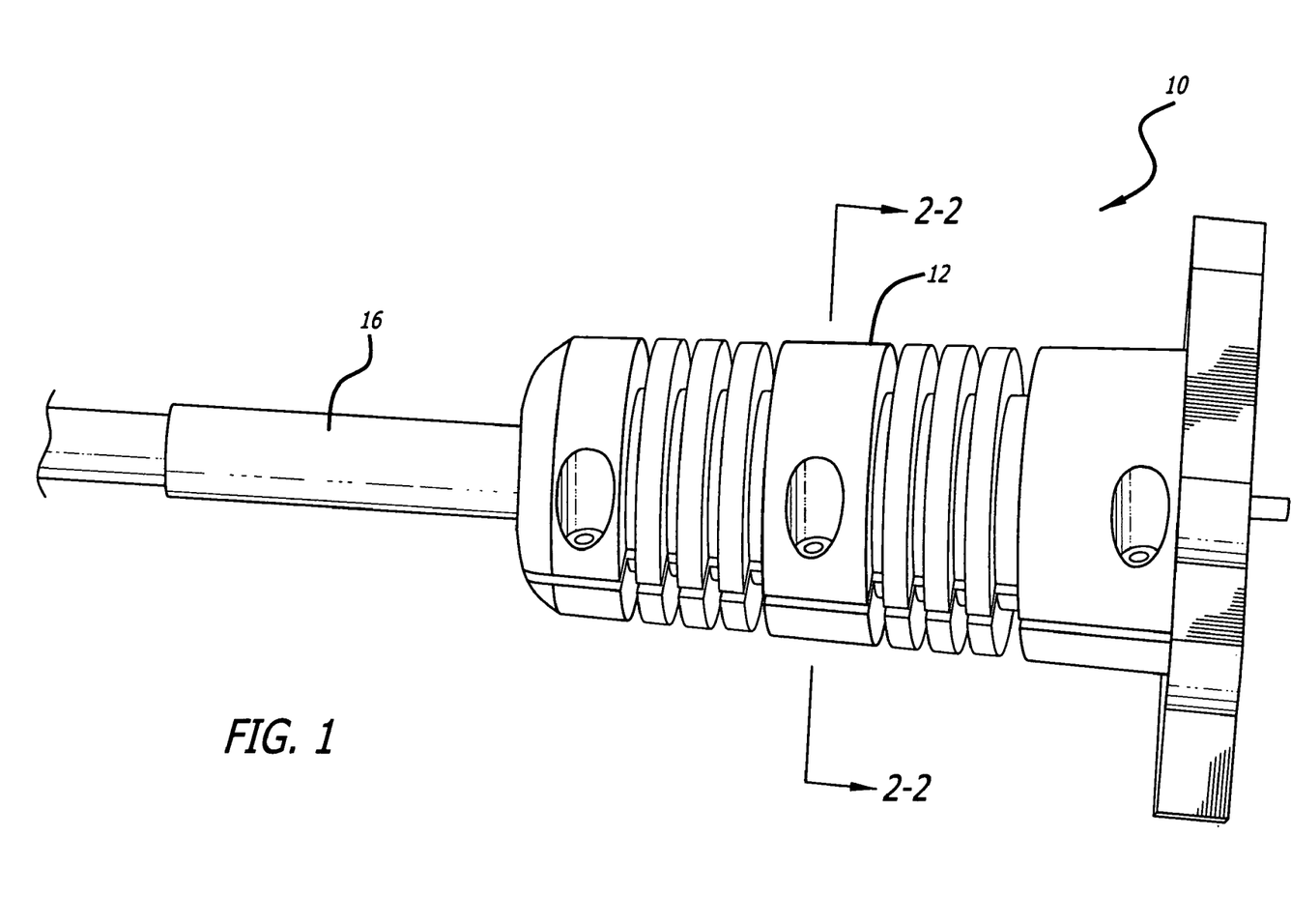
FIG. 1 shows a perspective view of an embodiment of an apparatus for coupling a fiber optic device to a laser.
Figure 2:
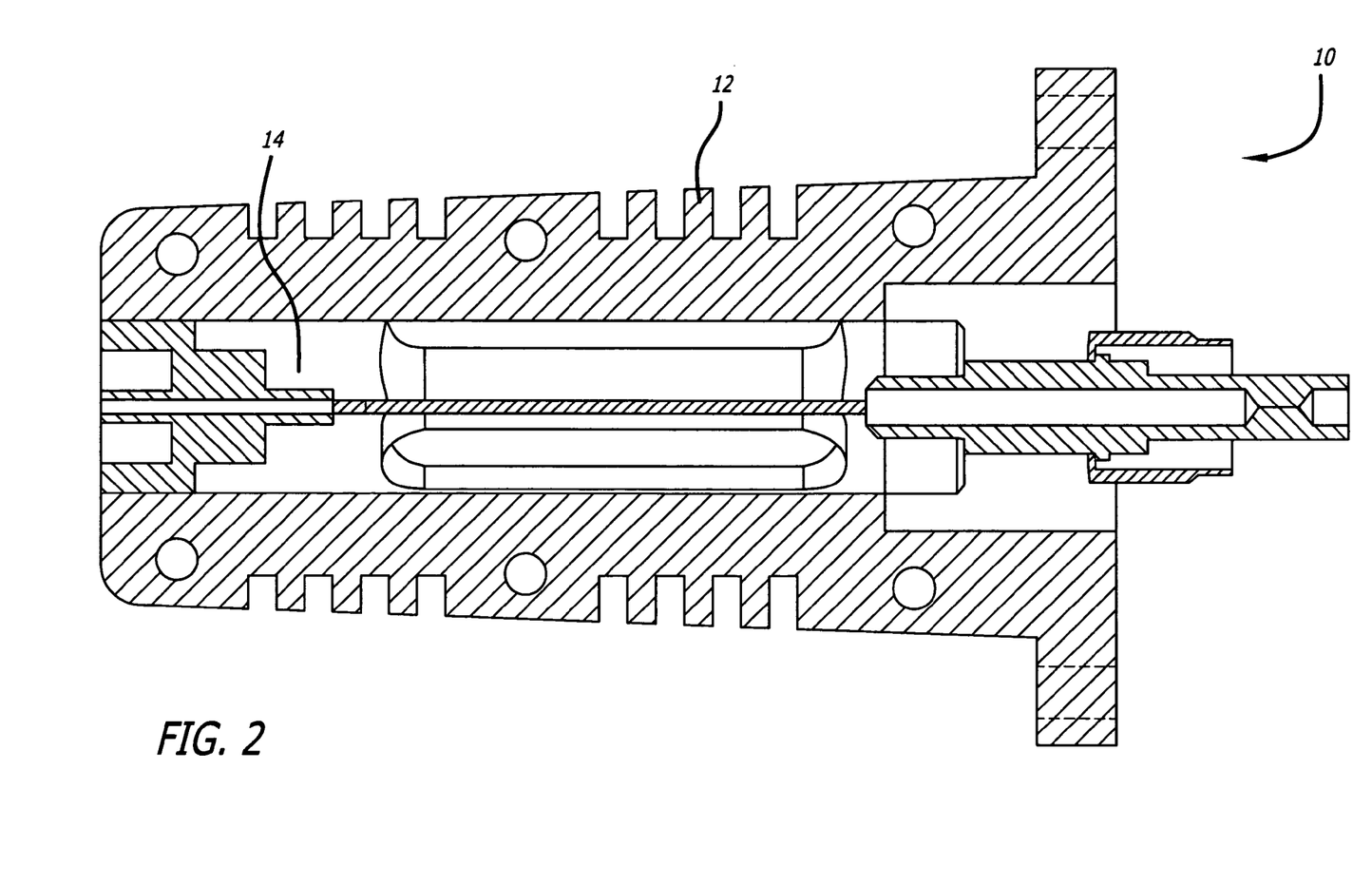
FIG. 2 shows a cross sectional view of an embodiment of an apparatus for coupling a fiber optic device to a laser viewed along line 2-2 shown in FIG. 1.

FIGS. 1 and 2 show an embodiment of an apparatus for coupling a fiber optic device to a laser or other source of optical radiation. As shown, the coupling system 10 includes a housing assembly 12 and fiber coupling device 14. In the illustrated embodiment the coupling system 10 is configured to couple a single fiber optic device 16 to a laser source (not shown). Optionally, coupling system 10 may be configured to couple multiple fiber optic devices 16 to one or more lasers or alternate light sources.

Figure 3:
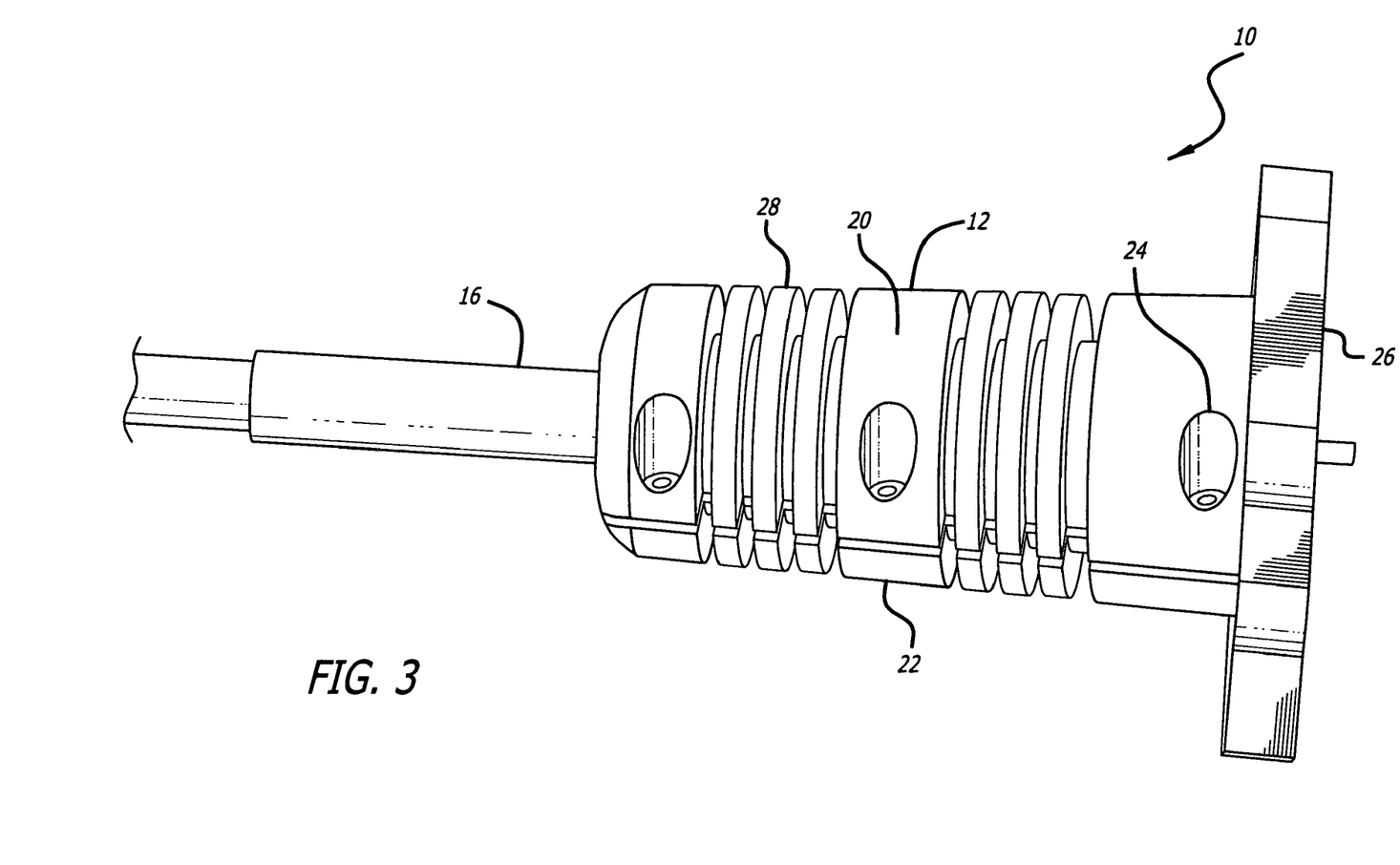
FIG. 3 shows a perspective view of a second housing body of a housing assembly of a coupling system coupled to a laser system.

FIG. 3 shows a perspective view of an embodiment of a housing assembly 12 which may be used with a coupling system 10. As shown, the housing assembly 12 comprises a first housing body 20 and at least a second housing body 22. In the illustrated embodiment, the first and second housing bodies 20, 22 are coupled together using one or more coupling members 24. Any variety of coupling members 24 may be used to couple the first and second housing bodies 20, 22. Exemplary coupling members 24 include, without limitation, screws, bolts, pins, clasps, lock members, friction couplers, and the like. In an alternate embodiment, at least one of the first and second housing bodies 20, 22 include one or more coupling members 24 formed integral therewith.

Referring again to FIG. 3, at least one of the first and second housing bodies 20, 22 includes one or more mounting flanges 26 formed thereon. The mounting flange 26 may be configured to couple the housing assembly 12 to a laser device or other light source. As such, the mounting flange 26 may be formed in any variety of shapes and configurations to enable the housing assembly 12 to couple to the light source. For example, the mounting flange 26 may be sized to couple to the housing assembly 12 to one or more diode laser systems. Exemplary diode laser systems include the ProLite® HCS laser system, manufactured by Spectra-Physics, Inc. In an alternate embodiment, the mounting flange 26 may be configured to couple the housing assembly 12 to any variety of laser systems, including solid state lasers, dye laser, gas lasers, disc lasers, VCSEL lasers, slab lasers, semiconductor lasers, silicon lasers, and the like. Further, the mounting flange 26 may be configured to couple one or more fiber lasers to one or more pump laser sources. Optionally, the mounting flange 26 may be configured to couple the housing assembly 12 to a laser source in sealed or non-sealed relation. As such, the mounting flange 26 may include one or more sealing members (not shown) thereon. Exemplary sealing members include, without limitation, o-rings, gaskets, bushings, and the like. Optionally, the mounting flange 26 may be operated without such sealing members.

As shown in FIGS. 1-3, the first and second housing bodies 20, 22 may include one or more surface irregularities 28 formed thereon. In one embodiment, the surface irregularities 28 form cooling elements or extensions configured to increase the surface area of the housing assembly 12 thereby improving the cooling of the housing assembly 12. In an alternate embodiment, the surface irregularities 28 comprise openings (not shown) formed in the first and second housing bodies 20, 22. These openings (not shown) may be in communication with one or more passages or channels formed in the housing bodies 20, 22, thereby forming inlets and outlets and permitting the housing assembly 12 to be fluid cooled. As such, the openings and passages may be in fluid communication with one or more sources of cooling fluid. Any number, variety, and shape of surface irregularities may be formed on any surface of the first and second housing bodies 20, 22.

As shown in FIGS. 1-3, the housing assembly 12 may be manufactured from copper. Those skilled in the art will appreciate that any variety of materials may be used to construct the various elements of the housing assembly. Exemplary materials include, without limitation, tungsten, steel, polymers, aluminum, ceramic, composite materials, metallic alloys, elastomers, glass, and the like. Further, multiple materials may be used to form the housing assembly 12. Further, the housing assembly 12 may be made in a variety of sizes to accommodate one or more fiber optic devices 16.

Figure 4:
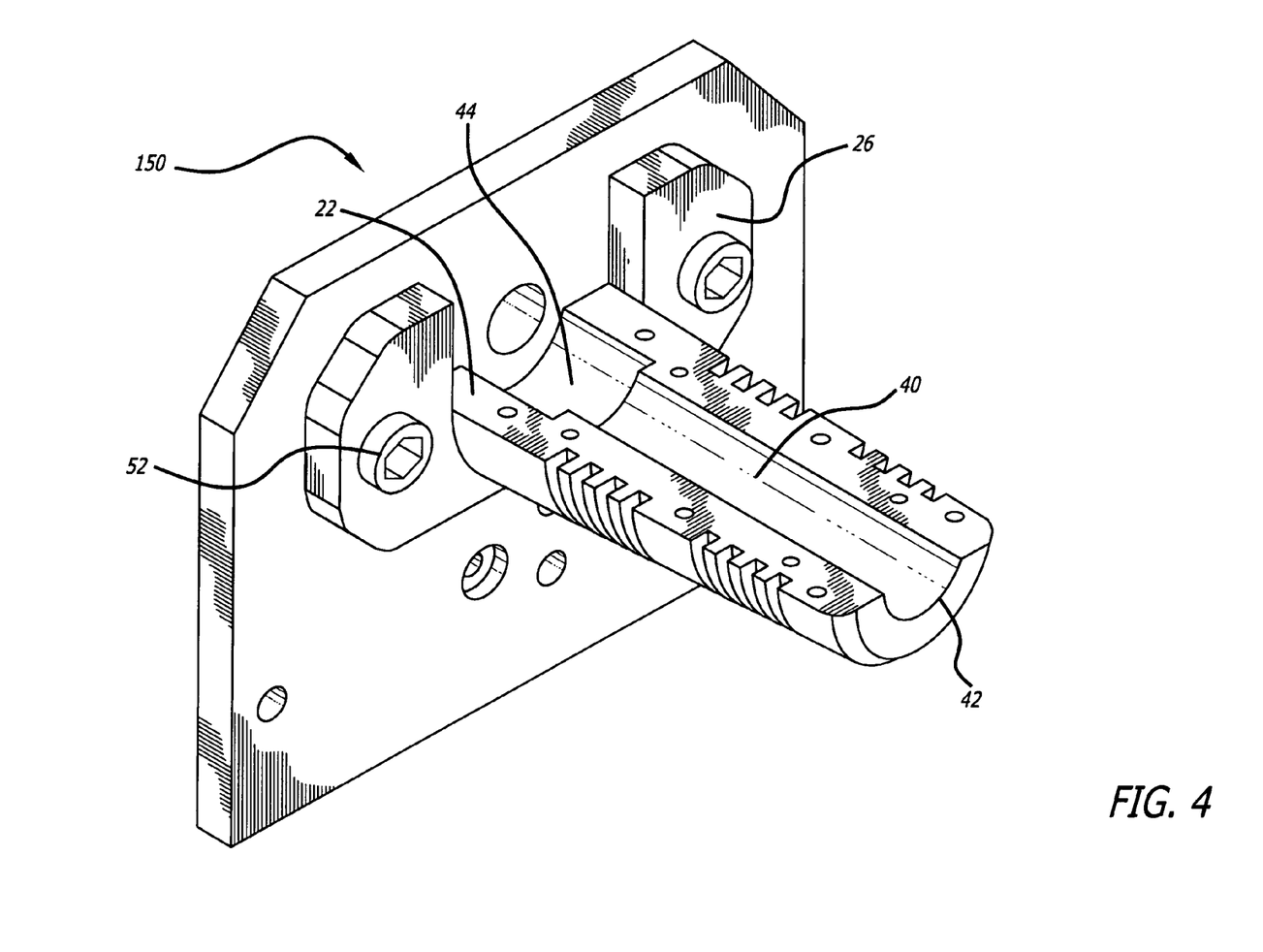
FIG. 4 shows a perspective view of a second housing body of a housing assembly of a coupling system.
Figure 5:
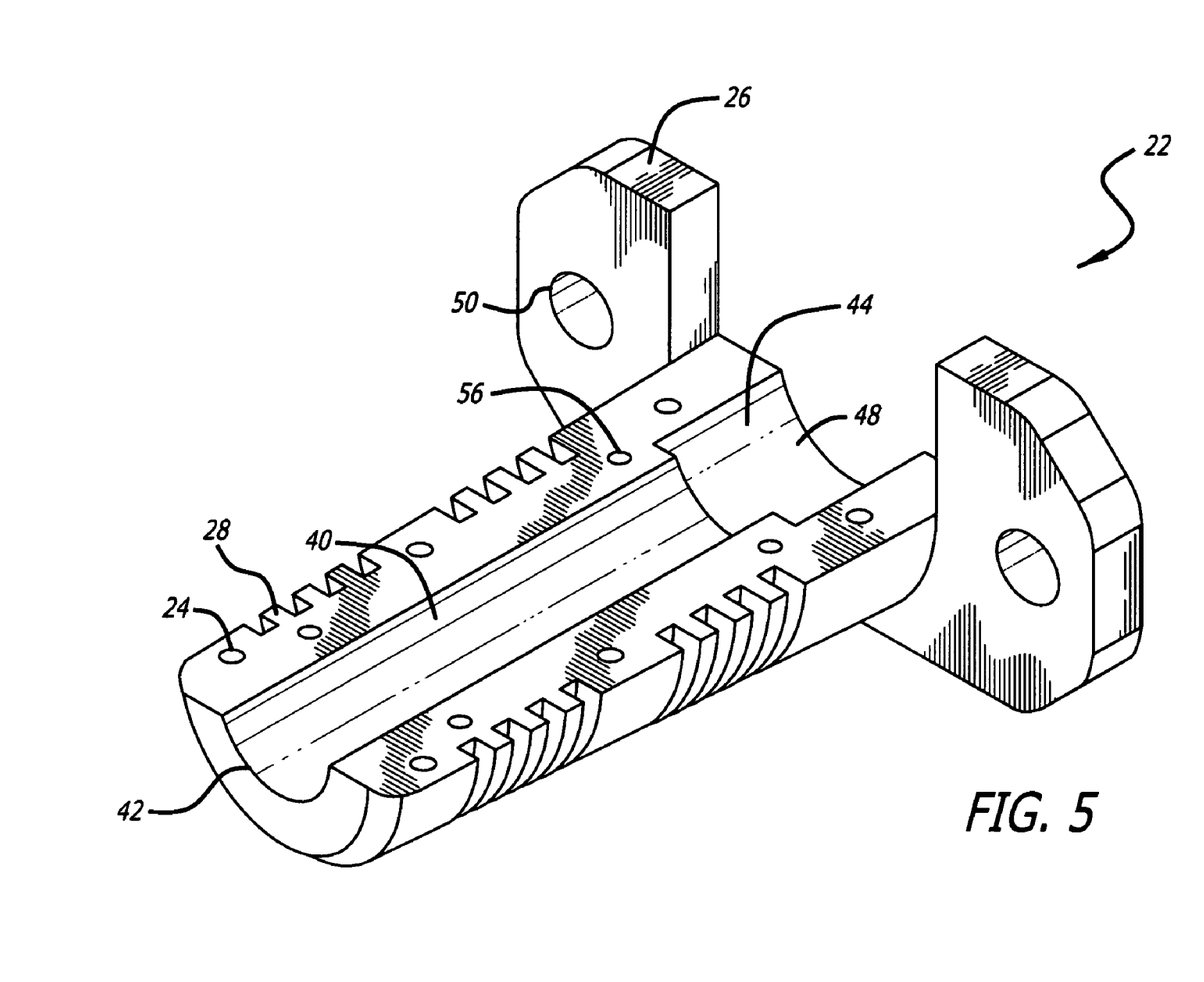
FIG. 5 shows a cross sectional view of a second housing body of a housing assembly of a coupling system view along lines 2-2 of FIG. 1.
Figure 6:
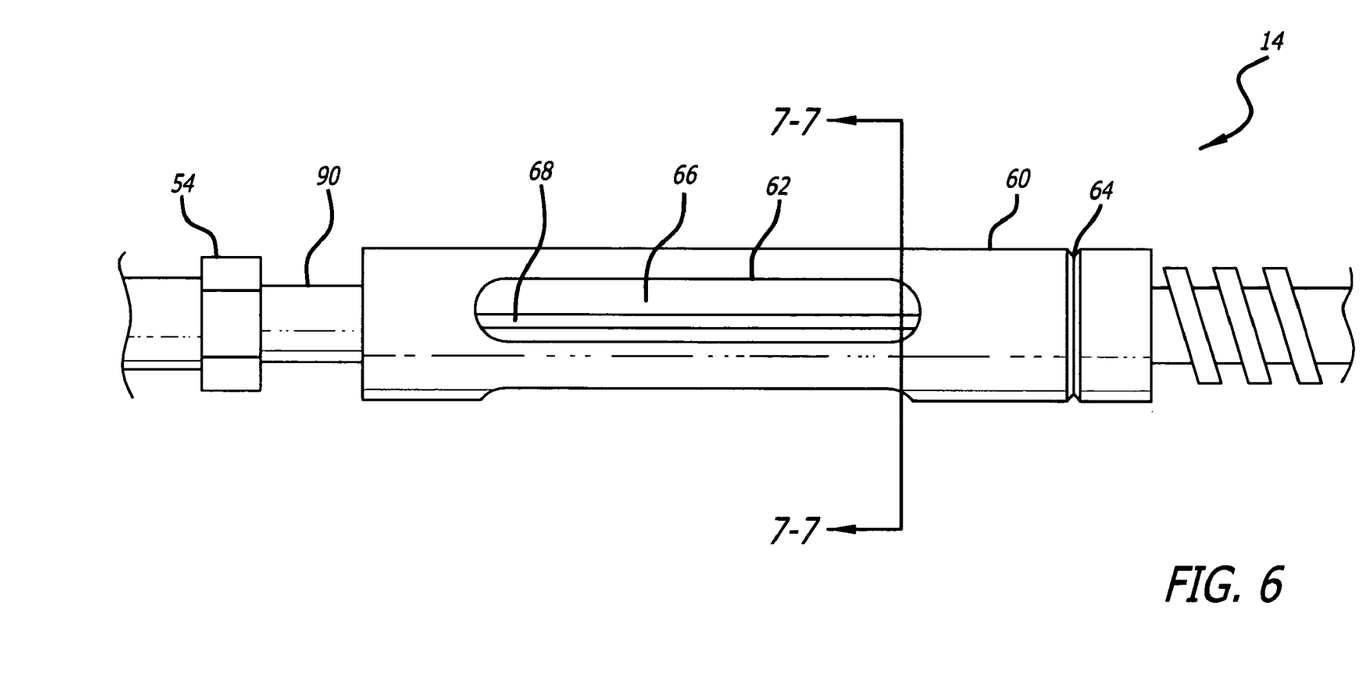
FIG. 6 shows a perspective view of an embodiment of a fiber coupler device for use with a coupling system.
Figure 7:
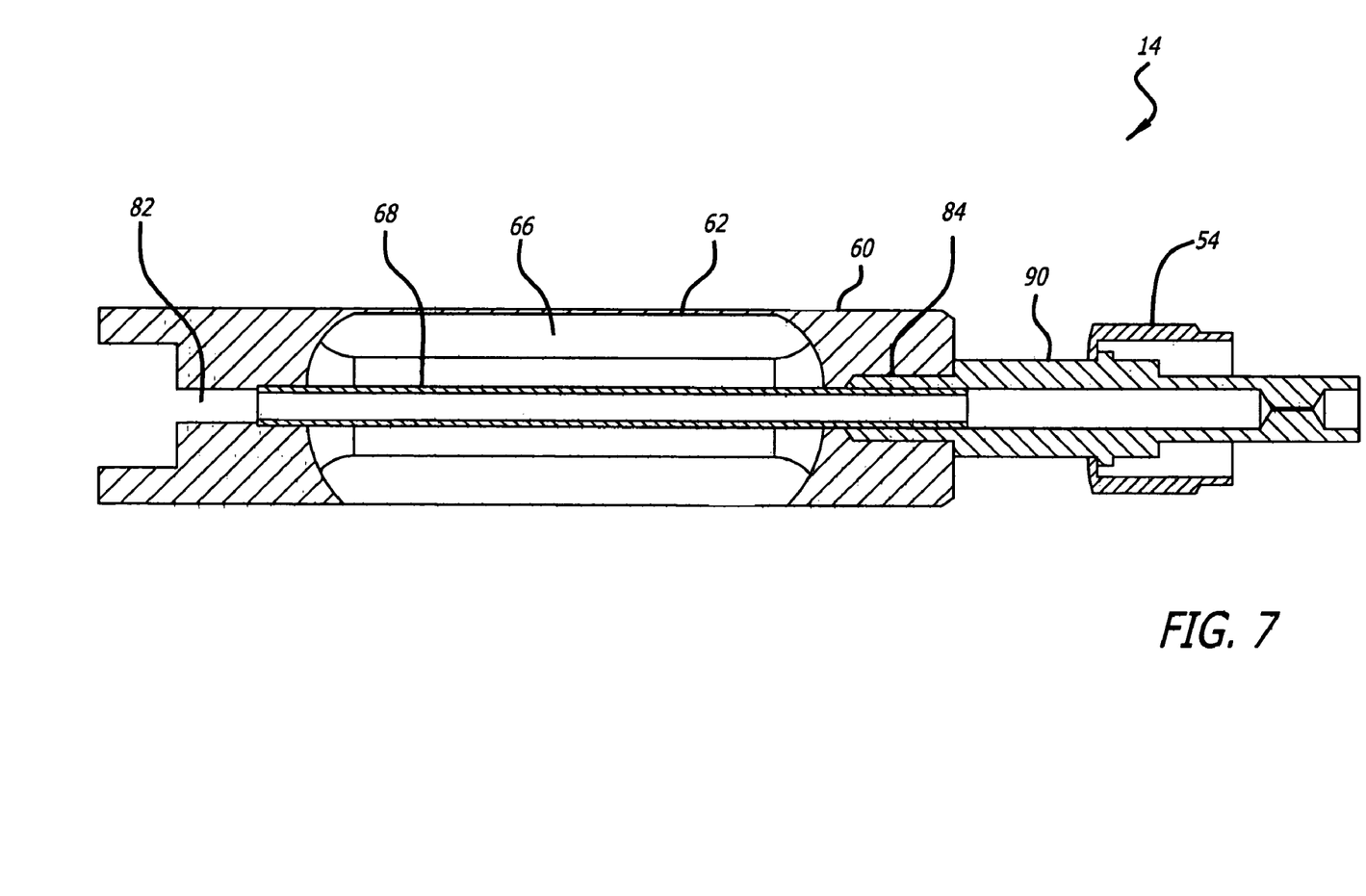
FIG. 7 shows a cross sectional view of an embodiment of a fiber coupler device for use with a coupling system view along lines 7-7 of FIG. 6.

FIGS. 4 and 5 show cross-sectional views of the housing assembly 12. FIG. 4 shows the second housing body 22 coupled to laser 150. As shown, couplers 52 are positioned within the coupling orifices 50 formed on the mounting flange 26. Exemplary couplers 52 include, without limitation, screws, pins, bolts, lock members, and the like. As shown in FIGS. 4 and 5, the second housing body 22 includes at least one passage 40 formed therein. In the illustrated embodiment, the passage 40 formed in the second housing body 22 cooperatively forms a cylindrical passage within the housing assembly 12 when coupled with the first housing body 20. As such, the first housing body 20 may include at least one passage therein. The passage 40 may be formed in any variety of shapes and sizes. For example, the passage 40 may be configured to receive one or more fiber optic devices therein. At least one fiber coupler receiver 42 and at least one coupling orifice 44 may be in communication with the passage 40. Optionally, one or more sizing members (not shown) may be configured to be positioned within the passage 40. The sizing members may be used to secure one or more fiber optic devices within the passage 40. Further, the sizing members may be used to precisely position the fiber optic device within the passage 40. Optionally, the sizing members may be integral to the passage 40 or may be detachably positionable therein. The housing assembly 12 may include at least one cap recess 48 formed proximate to the coupling orifice 44. The cap recess 48 may be sized to receive one or more cap devices therein.

As stated above, the mounting flange 26 may be coupled to or otherwise formed on at least one of the first and second housing bodies 20, 22. In the illustrated embodiment, the mounting flange 26 is integrally formed on the second housing body 22. Optionally, the mounting flange 26 may be coupled to the first and/or second housing bodies 20, 22. Further, the mounting flange 26 may be manufactured in any variety of shapes, sizes, thickness, and configurations to enable the housing assembly 12 to be detachably coupled to at least one laser source or light source. Optionally, the mounting flange 26 may be configured to be non-detachably coupled to at least one laser source or light source.

FIGS. 6-10 show various views of an embodiment of a fiber coupler device for use with the coupler system 10. As shown, the fiber coupler device 14 includes a body 60 having one or more openings 62 formed therein. Optionally, the body 60 may be manufactured without the openings 62. In addition, the body 60 may include one or more surface irregularities 64 formed thereon. In one embodiment, the surface irregularities 64 comprise extensions configured to increase the surface area of the body 60, thereby improving the cooling thereof. Any number, shape, and size of surface irregularities may be included on the body 60. In an alternate embodiment, the body 60 may include one or more orifices, channels, and or fluid pathways formed thereon or therein, thereby permitting the fiber coupler device to be fluid cooled. For example, the fiber coupler device 14 may be configured to be coupled in sealed relation to the housing assembly 12 which is coupled to a fluid source. As a result, the coupler system 10 and the various components thereof may be fluid cooled.

Referring again to FIGS. 6-10, the body 60 may include one or more coupling chambers 66 formed therein. In the illustrated embodiment, the coupling chamber 66 is formed from four passages formed in the body 60, although any number of passages may be formed in the body 60. In one embodiment, the coupling chamber 66 is configured to effectuate improved cooling of the body 60 when in use. Optionally, the body 60 may be manufactured without a coupling chamber 66 or openings 62 formed in the body 60.

In the illustrated embodiment, at least one light stripping element 68 is positioned within the coupling chamber 66. In one embodiment, the light stripping element 68 is configured to strip light emitted by the laser or optical radiation source having a larger beam size and/or higher numerical aperture than the fiber coupled thereto, thereby reducing or eliminating the introduction of light into the cladding of the fiber optic device without affecting light propagating within the fiber core. As such, at least one fiber optic device comprising at least one core and at least one cladding is positioned within the light stripping element 68. In one embodiment, the light stripping element 68 comprises a material body 70 having an index of refraction equal to or greater than the index of refraction of the cladding. In an alternate embodiment, the index of refraction of the material body 70 of the light stripping element 68 may be less than the index of the refraction of the cladding. As such, the light stripping element 68 is configured to out-couple light introduced into the cladding. As such, the material body 70 may be in communication with at least one fiber optic device positioned therein. Those skilled in the art will appreciate that the light stripping element 68 may be constructed of any variety of materials, including, without limitation, glass, ceramic, optical crystals, composite materials, membranes, films, thins films, and the like. Further, the light stripping element 68 may include one or more coatings applied to at least one surface thereof. For example, material body 70 of the light stripping element 68 may include one or more protective coatings applied to an exterior surface thereof. Exemplary protective materials include, without limitation, copper, nickel, titanium, metallic alloys, thin film materials, and the like. Optionally, the cladding of the fiber optic device may be configured to out-couple or scatter light therefrom proximate to the light stripping element 68. As such, at least a portion of the cladding may include light scattering elements or coating applied thereto. Exemplary light scattering elements include surface irregularities, coatings, slits, variances in transverse dimension, and the like configured to scatter therefrom.

Figure 8:
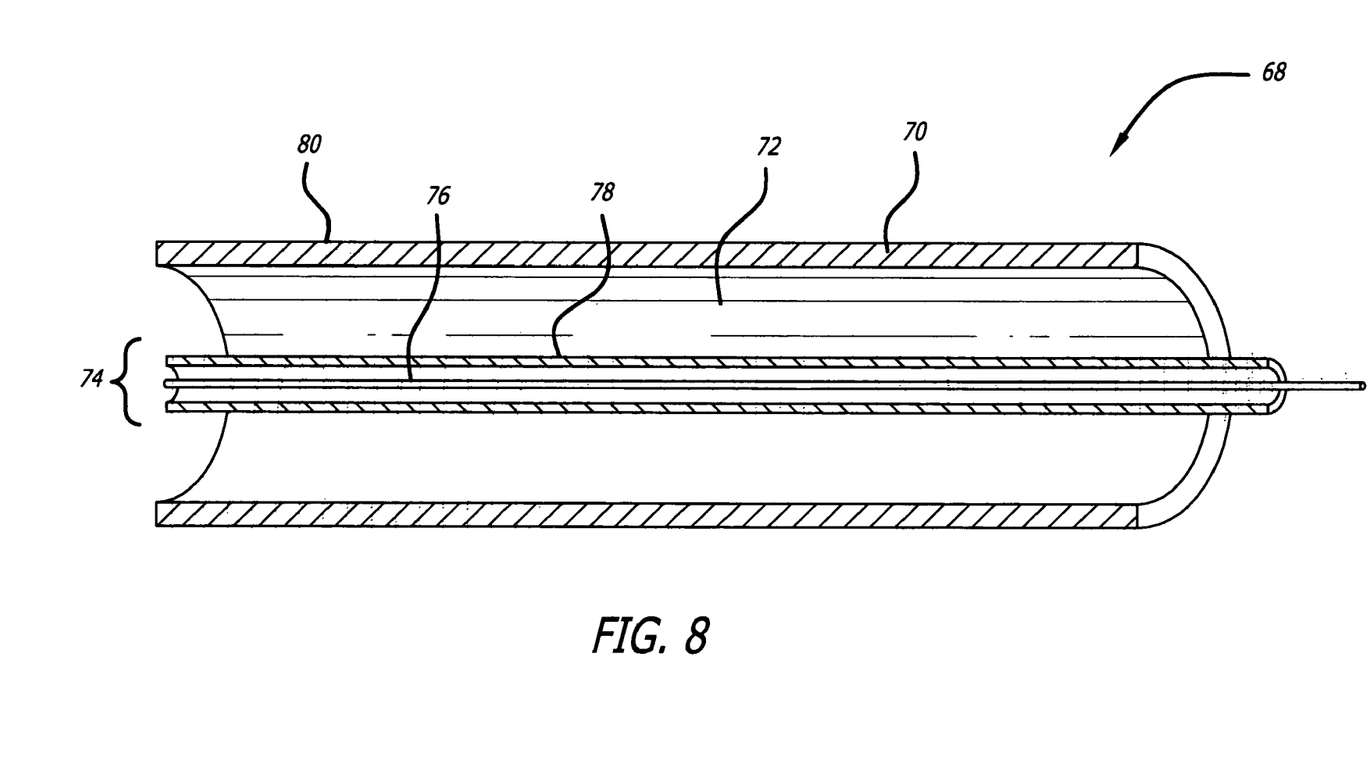
FIG. 8 shows a cross sectional view of an embodiment of a light stripping element for use with a coupling system view along lines 7-7 of FIG. 6.
Figure 9:
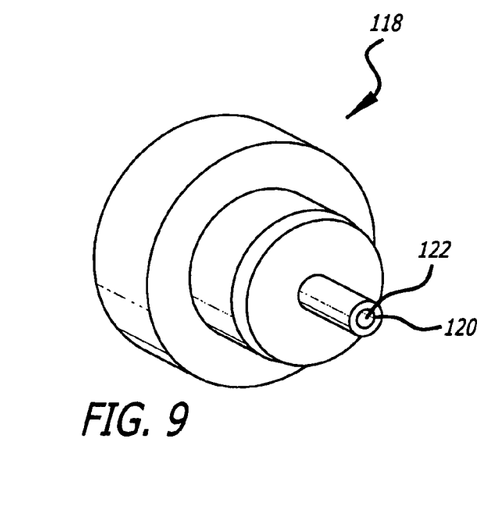
FIG. 9 shows a perspective view of an embodiment of a fiber coupler receiver ferrule for use with an embodiment of a fiber coupler device.

As stated above, the light stripping element 68 is configured to receive at least a portion of at a fiber optic device therein. FIG. 8 shows a cross sectional view of a portion of the material body 70 of a light stripping element 68 having a fiber optic device 74 positioned therein. As shown, the light stripping element 68 includes the material body 70 defining at least one stripping passage 72. The stripping passage 72 is sized to receive at least one fiber optic device 74 therein. Optionally, the interior wall of the material body 70 forming the stripping passage may be or may not be in contact with at least one surface of the fiber optic device 74. In another embodiment, one or more additional materials may be introduced into the stripping passage 72 to effectuate the out-coupling of light from the fiber optic device 74 to the material body 70. Exemplary materials include coatings, bonding agents, index matching materials, gases, fluids, liquids, dopants, and the like.

In the illustrated embodiment, the fiber optic device 74 comprises at least one core 76 positioned within at least one cladding 78. Those skilled in the art, however, will appreciate that the light stripping element 68 may be configured to work with any variety of fiber optic devices 74. At least one surface of the light stripping element 68 may optionally include at least one coating 80 applied thereto. In the illustrated embodiment, the coating 80 is applied to an external surface of the body. Optionally, the coating 80 may be applied to an internal surface of the body 70.

Referring again to FIGS. 6-10, the transverse dimension of the light stripping element 68 may be configured to assist in the light stripping process. In one embodiment, the fiber core has a core diameter of about 50 μm or less to about 2 mm or more, the cladding has a diameter of about 55 μm or less to about 2.2 mm or more, and the light stripping element 68 has a transverse dimension or diameter of 2.3 μm or less to about 100 mm. For example in one embodiment the core has a diameter of about 100 μm, the cladding has a diameter of about 1 mm, and the light stripping element 68 has a diameter of about 2 mm. As such, light emitted by the laser coupled into the cladding due to misalignment, fiber positioning, and/or the beam spot not sized or positioned within the transverse dimension of the fiber core or not positioned within or projected within an accepting numerical aperture of the core will be stripped by the light stripping element 68. Optionally, the passage 72 of the light stripping element 68 may be configured to receive one or more materials therein, including, without limitation, fluids, light scattering materials, light absorbing materials, gases, solids, and the like. Further, one or more dopants, treatments, scattering irregularities, scattering bodies, coatings and/or the like may be applied to the cladding of the fiber device to scatter light entering therein. As such, light entering the cladding 78 may be stripped using one or more scattering techniques known in the art.

Referring again to FIGS. 6-10, during use one or more fiber devices 16 are securely positioned and retained by the fiber couple receiver ferrule 118 which may inserted into the fiber coupler receiver 82 formed on the body 60 of the fiber coupling device 14. In one embodiment, the fiber couple receiver ferrule 42 includes a body 120 having a body extension 122 configured to be inserted into the fiber coupler receiver 82. As such, the fiber couple receiver ferrule 118 may be used to secure the fiber optic device 16 to the fiber coupler receiver 82. In an alternate embodiment, the fiber optic device 16 may be secured to the fiber coupler receiver 82 using one or more securing devices. Exemplary coupling devices include, without limitation, epoxies, adhesives, slip-fit devices, press-fixtures, retaining clamps, and the like. The fiber optic device 16 continues through the light stripping element 68 positioned within the coupling chamber 66 of the body 60. As such, the fiber coupler receiver 82 is in communication with the coupling chamber 66. The light stripping element 68 is coupled to or otherwise in communication with the fiber coupler receiver 82 and an alignment ferrule 90 via an alignment ferrule receiver 84. As such, the alignment ferrule 90 is in communication with the fiber coupler receiver 82. As such, the fiber optic device 16, positioned within the alignment ferrule 90 coupled to the body 60, may be coupled to a laser source. Those skilled in the art will appreciate that unlike prior art devices, the coupling system 10 minimizes fiber contact within the light stripping region. In contrast, prior art-systems which typically include epoxy materials to secure the fiber optic device within or proximate to the light stripping region fail when used for high power applications. For example, high power applications may include power ranges from about 1 w and above.

Figure 10:
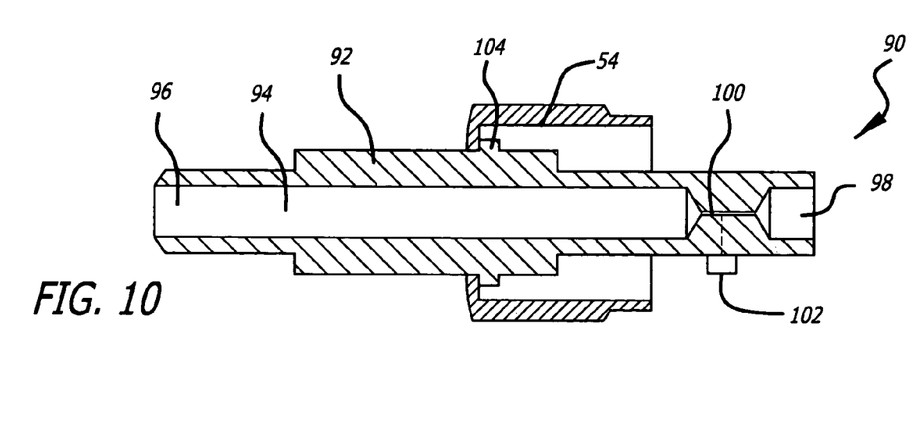
FIG. 10 shows a cross sectional view of an embodiment of an alignment ferrule for use with an embodiment of a fiber coupler device view along lines 7-7 of FIG. 6.

FIG. 10 shows an embodiment of an alignment ferrule 90 for use with a fiber coupling device 14. As shown, the alignment ferrule 90 includes a body 92 defining at least one alignment passage 94 therein. The alignment passage 94 is in communication with a fiber receiving aperture 96 and a coupling aperture 98. Further, the alignment passage 94 may include one or more alignment region configured to secure the fiber optic device and align the fiber optic device to the output of the laser source. Optionally, the alignment region 100 may be in communication with at least one alignment adjuster 102 configured to adjust the location of the alignment region 100 relative to the laser source. As such, the present system allows the user to easily align and adjust the position of an end surface of the fiber optic device relative to the laser or optical radiation source. In addition, the alignment ferrule 90 may include one or more cap retainers 104 configured to retain the cap device 54 thereon.

Figure 11:
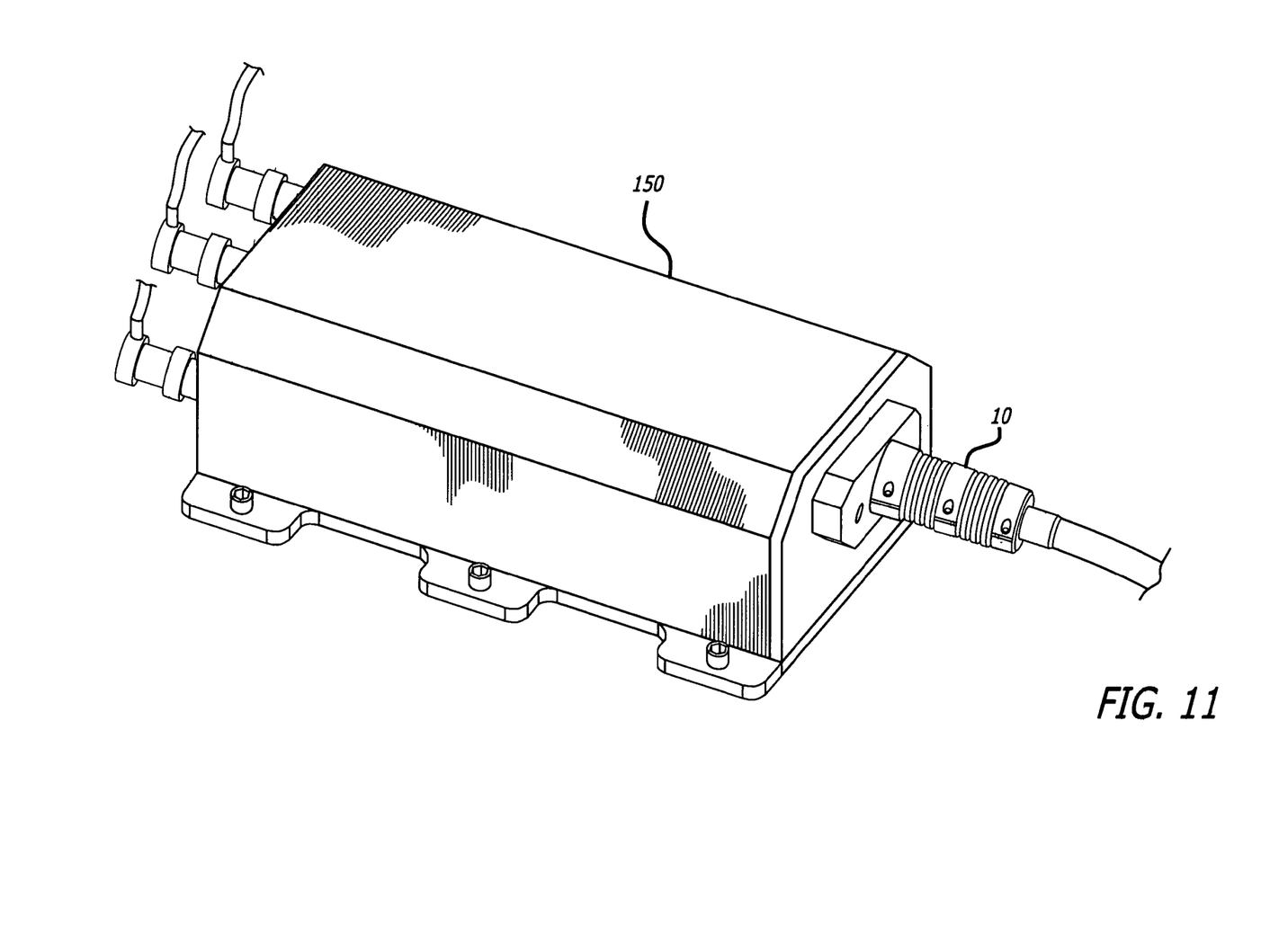
FIG. 11 shows a perspective view of an embodiment of a laser device having an embodiment of a system for coupling a fiber optic device to a laser coupled thereto.

FIG. 11 shows the coupler system 10 connected to a laser 150. As stated above, the coupler system 10 includes fiber coupler device 14 positioned within the housing assembly 12. Those skilled in the art will appreciate, however, that the fiber coupler device 14 and the housing assembly 12 may each be employed separately. Further, those skilled in the art will appreciate the fiber coupler device 14 and/or the housing assembly 12 may be manufactured from any variety of materials, including, without limitation, copper, tungsten, glass, alloys, composite materials, elastomers, stainless steel, aluminum, titanium, ceramics, polymers, and the like.

With reference to FIGS. 1-11, during use a fiber optic device 16 is positioned within the fiber coupler device 14 such that the core and cladding traverse through the light stripping element 68 positioned within the passage 40 of the stripping passage 72 of the fiber coupling device 14. Further, the core and cladding are positioned within the alignment region 100 of the alignment ferrule 90. Thereafter, the cap device 54 of the fiber coupler device 14 is coupled to the laser 150. Once the fiber coupler device 14 is coupled to the laser the fiber coupler device 14 is positioned within the passage 40 formed by the first and second housing bodies 20, 22. The first and second housing bodies 20, 22 are then coupled together using one or more coupling members 24. Finally, the housing assembly 12 is coupled to the laser 150 using one or more couplers 52 positioned within one or more coupler orifices 50.

Those skilled in the art will appreciate, however, that the fiber coupler device 14 and the housing assembly 12 may each be employed separately. Further, those skilled in the art will appreciate the fiber coupler device 14 and/or the housing assembly 12 may be manufactured from any variety of materials, including, without limitation, copper, tungsten, glass, alloys, composite materials, elastomers, stainless steel, aluminum, titanium, ceramics, polymers, and the like. Further, other modifications may be employed which are within the scope of the invention. Accordingly, the devices disclosed in the present application are not limited to that precisely as shown and described herein.

What is claimed is:

1. A system for coupling at least one fiber optic device to a laser, comprising:
   at least one fiber coupler device including:
      a body which defines at least one coupling chamber that is formed from one or more openings in the body, that is configured to effectuate improved cooling of the body, and that is sized to receive at least one fiber optic device therein,
      at least one light stripping element positioned within the coupling chamber, the light stripping element comprising a material body including an index of refraction greater than an index of refraction of a cladding of the fiber optic device, the light stripping element configured to be disposed about the at least one fiber optic device and outcouple light from the cladding of the fiber optic device, and
      an alignment ferrule coupled to the body, the alignment ferrule including an alignment region configured to secure an end surface of the at least one fiber optic device; and
   a housing assembly which is configured to dissipate heat, which is coupled to the body of the at least one fiber coupler device with the housing disposed over the one or more openings of the body and the body of the fiber coupler device positioned within a passage of the housing assembly and which is configured to couple the at least one fiber coupler device to an output of a laser.

2. The system of claim 1 wherein the body of the fiber coupling device includes one or more surface irregularities formed thereon, the surface irregularities configured to improve the cooling efficiency thereof.

3. The system of claim 1 wherein the body of the fiber coupling device includes a fiber coupler receiver configured to have one or more fiber optic devices secured thereto.

4. The system of claim 3 further comprising at least one stripping passage formed within the material body and sized to receive the at least one fiber optic device therein.

5. The system of claim 1 wherein the housing assembly further comprises a first housing body and a second housing body, the first and second housing body configured to form the passage which is sized to receive the fiber coupler device therein.

6. The system of claim 1 wherein the housing assembly includes one or more surface irregularities formed thereon.

7. The system of claim 6 wherein the surface irregularities comprise one or more extensions configured to increase the surface area of the housing assembly and improve heat dissipation form the housing assembly.

8. The system of claim 6 wherein the surface irregularities comprise one or more openings in fluid communication with one or more fluid passages formed within the housing assembly, the openings and fluid passages in fluid communication with a source of cooling fluid.

9. The system of claim 1 wherein the housing assembly includes at least one mounting flange, the mounting flange configured to couple the housing assembly to the laser.

10. A system for coupling at least one fiber optic device to a laser, comprising:
    a fiber coupler device including
       a body which defines at least one coupling chamber that is formed from one or more openings in the body, that is configured to effectuate improved cooling of the body, that is in communication an inlet and an outlet, and that is sized to receive at least one fiber optic device therein,
       a light stripping element positioned within the coupling chamber and configured to strip light from a cladding of the at least one fiber optic device, and
       an alignment ferrule secured to the body, the alignment ferrule including an alignment region configured to secure an end surface of the at least one fiber optic device; and
    a housing assembly configured to dissipate heat and secure the fiber coupler device to a laser with the housing disposed over the one or more openings of the body and the body of the fiber coupler device positioned within a passage of the housing assembly, and with the fiber coupler device including a fiber coupler receiver formed therein, the fiber coupler receiver configured to receive a fiber couple receiver ferrule therein.

11. The system of claim 10 wherein the body of the fiber coupling device includes the fiber coupler receiver configured to receive the fiber couple receiver ferrule.

12. The system of claim 10 wherein the light stripping element comprises a material body having an index of refraction greater than the index of refraction of a cladding of the fiber optic device, the light stripping element configured to outcouple light from the cladding of the fiber optic device.

13. The system of claim 10 wherein the housing assembly further comprises a first housing body and a second housing body, the first and second housing body configured to form the passage which is sized to receive the fiber coupler device therein.

14. The system of claim 10 wherein the housing assembly includes one or more surface irregularities formed thereon and configured to increase the surface area of the housing assembly and improve heat dissipation form the housing assembly.

15. The system of claim 10 wherein the housing assembly includes at least one mounting flange configured to couple the housing assembly to the laser.

16. A system for coupling at least one fiber optic device to a laser, comprising:
 a fiber coupler device including
  a body which defines at least one coupling chamber that is formed from one or more openings in the body, that is configured to effectuate improved cooling of the body, that is in communication with an inlet and an outlet, and that is sized to receive the at least one fiber optic device therein, and
  a light stripping element positioned within the coupling chamber and configured to strip light from a cladding of the at least one fiber optic device; and
 a housing assembly which is configured to dissipate heat, which is coupled to the body of the fiber coupler device with the housing disposed over the one or more openings of the body and the body of the fiber coupler device positioned within a passage of the housing assembly, which is configured to secure the fiber coupler device to the laser, and which includes a first housing body which is configured to be coupled with a second housing body to form the passage which is configured to receive the body of the fiber coupler device therein.

17. The system of claim 16 wherein the body of the fiber coupling device includes a fiber coupler receiver configured to have one or more fiber optic devices secured thereto and an alignment ferrule coupled to the body and including an alignment region configured to secure an end surface of the at least one fiber optic device with the laser.

18. The system of claim 16 wherein the light stripping element comprises a material body having an index of refraction greater than the index of refraction of a cladding of the fiber optic device, the light stripping element configured to outcouple light from the cladding of the fiber optic device.

19. The system of claim 16 wherein the housing assembly includes one or more surface irregularities formed thereon which are configured to increase a surface area of the housing assembly and improve heat dissipation form the housing assembly.

20. The system of claim 16 wherein the housing assembly includes at least one mounting flange configured to couple the housing assembly to the laser.

21. The system of claim 18 wherein the light stripping element for outcoupling light from a cladding of a fiber optic device further comprises:
 a tubular material body having an index of refraction greater than the index of refraction of a cladding of the fiber optic device; and
 at least one stripping passage formed within the material body and sized to received the fiber optic device therein with an interior wall of the material body not in contact with an outside surface of the fiber optic device.

22. The system of claim 21 wherein the light stripping element has a transverse dimension of about 2.3 µm or less to about 100 mm.

* * * * *

UNITED STATES PATENT AND TRADEMARK OFFICE
CERTIFICATE OF CORRECTION

PATENT NO. : 7,866,897 B2
APPLICATION NO. : 11/973207
DATED : January 11, 2011
INVENTOR(S) : Yongdan Hu, Oscar Romero and James Harrison It is certified that error appears in the above-identified patent and that said Letters Patent is hereby corrected as shown below:

In the Claims

Column 8
    Claim 7, line 35 should read:
        "pation from the housing assembly."
Column 9
    Claim 14, line 17 should read:
        "assembly and improve heat dissipation from the housing"
Column 10
    Claim 19, line 20 should read:
        "assembly and improve heat dissipation from the housing"
Column 10
    Claim 21, line 32 should read:
        "body and sized to receive the fiber optic device therein"

Signed and Sealed this
Fourteenth Day of July, 2015

Michelle K. Lee
*Director of the United States Patent and Trademark Office*